United States Patent [19]

Jensen

[11] Patent Number: 5,117,493
[45] Date of Patent: May 26, 1992

[54] PIPELINED REGISTER CACHE

[75] Inventor: Eric H. Jensen, Livermore, Calif.

[73] Assignee: Sun Microsystems, Inc., Mountain View, Calif.

[21] Appl. No.: 390,215

[22] Filed: Aug. 7, 1989

[51] Int. Cl.⁵ .................................................. G06 9/38
[52] U.S. Cl. ............................ 395/425; 364/DIG. 1
[58] Field of Search ... 364/200 MS File, 900 MS File

[56] References Cited

U.S. PATENT DOCUMENTS

| | | | |
|---|---|---|---|
| 4,347,567 | 8/1982 | DeTar, Jr. et al. | 364/200 |
| 4,467,414 | 8/1984 | Akagi et al. | 364/200 |
| 4,517,640 | 5/1985 | Hattori et al. | 364/200 |
| 4,807,185 | 2/1989 | Kamiya | 364/900 |
| 4,835,738 | 5/1989 | Niehaus et al. | 364/900 |

*Primary Examiner*—Stuart N. Hecker
*Assistant Examiner*—Reba I. Elmore
*Attorney, Agent, or Firm*—Blakely, Sokoloff, Taylor & Zafman

[57] ABSTRACT

A pipelined register cache for increasing a computer processor's execution speed by reducing the time required to access register data. A register cache is implemented to keep often-used registers in high-speed storage immediately available to the processor's arithmetic and logic unit (ALU). The register cache is constructed using a number of individual register stages which are connected in series such that the register information contained in each register stage is passed from one register stage to the next in a First-In, First-Out (FIFO) queue arrangement. Each register stage stores a register address tag for identifying the particular primary register being represented in that register stage, and a data value representing the actual register contents. When a register that is not represented in the cache is needed for a calculation, the register information is first loaded from the primary register storage into the first register stage of the register cache. Once the register is represented in register cache, it can be accessed quickly by the arithmetic and logic unit for computations. As new register information is loaded into the register cache, the older register information in each register stage is passed from one register stage to the next. When register information overflows from the last register stage it is then placed back into the primary register storage.

11 Claims, 4 Drawing Sheets

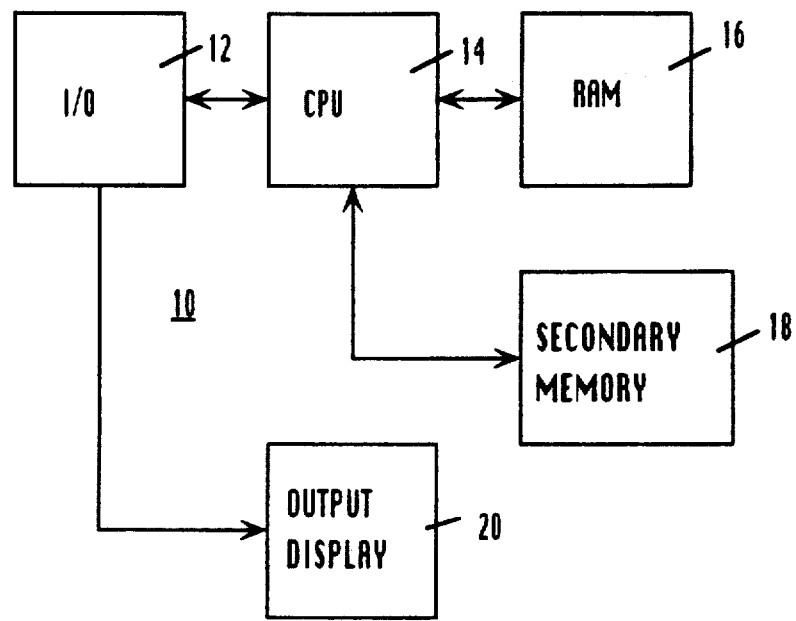
FIGURE 1 - PRIOR ART
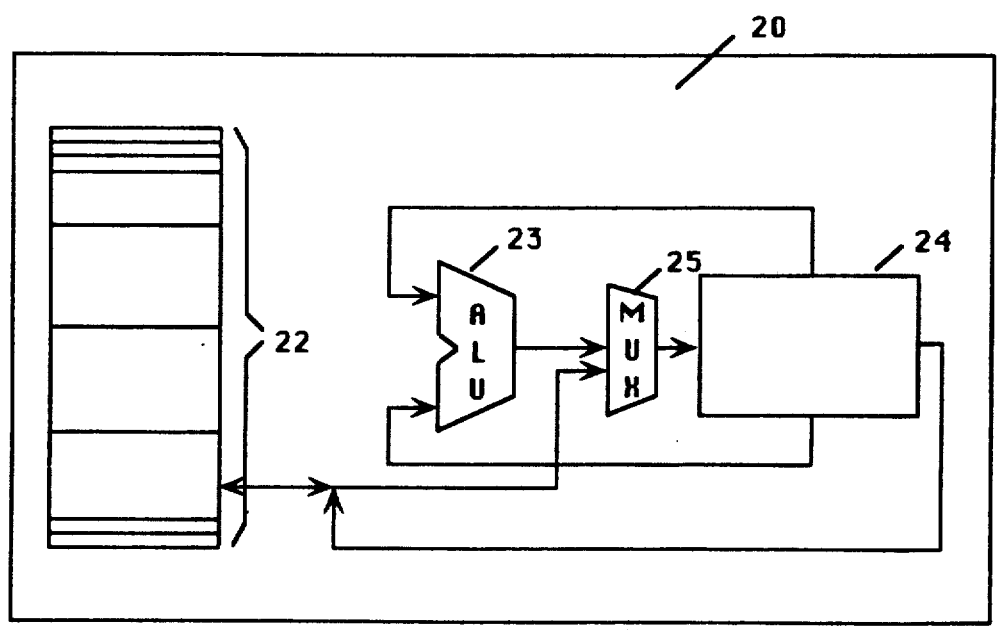
FIGURE 2

|    | S1 | S2 | S3 | S4 | S5 | S6 | S7....S16 |
|----|----|----|----|----|----|----|-----------|
| T0 | R4 | R6 | R5 | R2 |    |    |           |
| T1 | R1 | R4 | R6 | R5 | R2 |    |           |
| T2 | R3 | R1 | R4 | R6 | R5 | R2 |           |
| T3 | R2 | R3 | R1 | R4 | R6 | R5 |           |
| T4 | R7 | R2 | R3 | R1 | R4 | R6 | R5        |

$\underline{90}$

ADVANCE = $r_V$ AND NOT($rd_{HITi-1}$ OR $rd_{HITi-2}$ OR $rd_{HITi-3}$ ......)

PIPELINED REGISTER CACHE

BACKGROUND OF THE INVENTION

1. Field of the Invention

This invention relates to computer systems and, more particularly, to the organization of registers in the central processing unit of a computer system.

2. History of the Prior Art

In the digital computers of the prior art, registers make up the primary means of accomplishing the mathematical and logical operations. For example, in an add operation, a first number is stored in one register, a second number is stored in a second register, and the numbers in each are combined and stored in a third register. Each register is essentially an area capable of storing a convenient number of digits (usually in binary form) to represent the data and instructions with which the computer system deals. In some systems these registers are physical portions of hardware specific to a particular use as a register; in others, the registers are parts of general memory mapped in such a way that they may be utilized as registers. In some cases these registers have specific functions; in others, they may be used for any of a number of functions.

In computer systems, it has been determined that greater system speed can be attained, in general, with a larger number of registers because, among other things, with a larger number of registers a number of operations may be running concurrently before the necessity of storing intermediate results in general memory is reached. Consequently, some modern computer designs involve central processing units (CPUs) with as many as one hundred and twenty-eight individual registers.

Obviously, as the number of registers available to a processor grows, the complexity of the circuitry for addressing a register, and for loading and emptying its contents, also grows. Ultimately, this increase in the number of registers becomes counter-productive; and the overhead imposed on the system becomes greater than the additional speed provided by the additional registers.

Various means of overcoming this limitation have been tried. In general, these means have involved using higher speed components for the registers and attendant circuitry. However, in advanced systems making use of processors which are conventionally organized, this effort is to no end because the real limiting factor at the operating speeds attained is the speed of electricity.

SUMMARY OF THE INVENTION

It is, therefore an object of the present invention is improve the speed of computer systems.

Another object of the present invention is to increase the speed of computer systems having processors which utilize a large number of registers.

An additional object of this invention is to reduce the cost of computer systems.

A more particular object of this invention is to reorganize the architecture of a processor in order to speed its operation.

These and other objects and features of the invention are realized in a computer system is accordance with the present invention by a central processing unit which includes a pipelined register cache comprising a limited number of individual registers equivalent to the number of registers utilized in a similar central processing unit. Circuitry is provided for deriving information from individual primary registers in memory and placing that information in designated ones of the pipe-lined register cache. Circuitry is provided for piping information from one stage to the next in the register cache. Circuitry is also provided for deriving the information from a cache register stage and utilizing that information with information in other cache register stages to provide the logical and mathematical functions of the primary registers of a central processing unit. An arithmetic and logic unit is provided for overall control of the cache register, and first and second busses each connecting each of the register stages to the arithmetic and logic unit are utilized for implementing this control.

The use of the register cache arrangement of the present invention speeds the operation of the registers of a preferred embodiment of a computer system using the invention over the more conventional processor arrangement twofold by eliminating much of the time necessary to gain access to primary registers and by providing register results without the usual delay. Moreover, the arrangement also allows the cost of the primary registers used in the system to be reduced to the cost of the normal random access memory used with the system.

These and other features and advantages of the invention will become apparent to those skilled in the art upon reading the following detailed description taken in conjunction with the drawings in which like designations have been used to describe like elements throughout the several views.

BRIEF DESCRIPTION OF THE DRAWINGS

FIG. 1 is a block diagram illustrating a general purpose computer system which may include the present invention;

FIG. 2 is a block diagram illustrating a central processing unit of a computer system constructed in accordance with the present invention;

NOTATION AND NOMENCLATURE

Figures 3, 4:
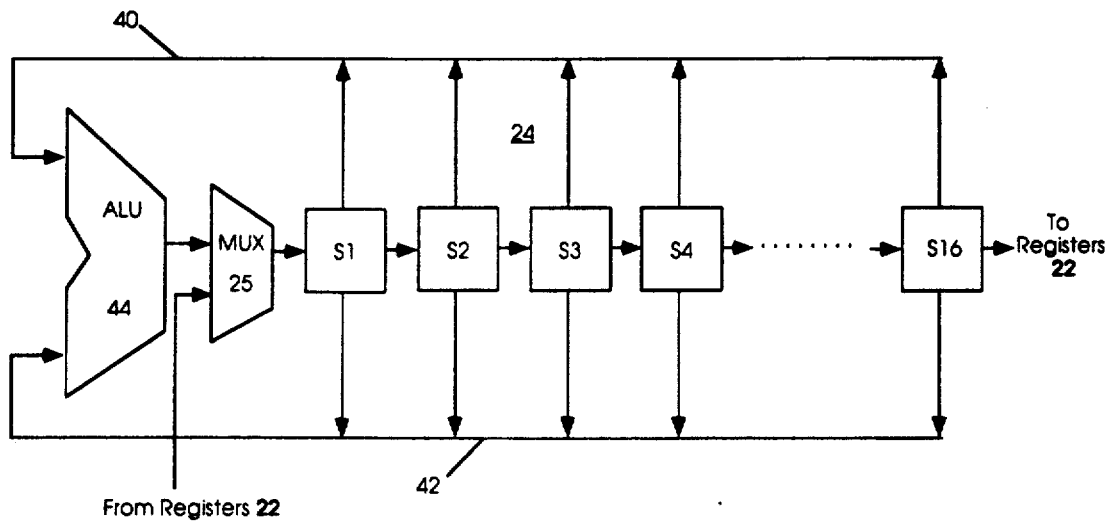
FIG. 3 is a block diagram illustrative of a register cache constructed in accordance with the present invention.
FIG. 4 is a drawing illustrating a sequence of operations within the register write buffer illustrated in FIG. 3.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to both apparatus and method steps for operating a computer in processing electrical or other (e.g. mechanical, chemical) physical signals to generate other desired physical signals.

DESCRIPTION OF THE PREFERRED EMBODIMENT

Referring now to FIG. 1 there is shown a general purpose computer system which may utilize the present invention. The computer 10 includes an input/output section 12, a central processing unit (CPU) 14, random access memory (RAM)16, secondary memory 18, and output display 20. Information and instructions are selectively entered using input/output circuitry 12 and placed in RAM 16 under control of CPU 14 in a manner well known to the prior art. The information is manipulated in accordance with the instructions under control of the CPU 14, and the results are provided to the output display or other output device through the input/output circuitry 12 also in a manner well known to the prior art.

FIG. 2 illustrates in block diagram form a central processing unit (CPU) 20 constructed in accordance with the invention. The CPU 20 comprises among other elements a number of primary registers 22. In the preferred embodiment of the invention, the system is able to utilize thirty-two individual registers at a time, but these thirty-two registers may be selected from a much larger number of registers which may be accessed in groups of thirty-two. The preferred system, in fact, includes five hundred and twelve individual registers each of which is capable of handling 32 bits of information. In the preferred embodiment of the invention, the five hundred and twelve registers are individually mapped into random access memory by means of a window number and an offset from the window base.

In operating a computer system using the registers 22 illustrated in FIG. 2, it has been determined that having a large number of registers saves time by allowing a number of different operations to be run concurrently with many fewer interruptions which would require intermediate results to be stored in RAM and later restored. However, a limiting factor has become the time necessary to write to and read from the slower individual registers of the registers 22. It is for this reason that a register cache has been devised in accordance with the present invention.

The register cache is illustrated in FIG. 2 as block 24. The register cache 24 operates in a manner somewhat analogous to computer memory caches (such as cache memory) to handle information which might be handled in other portions of the systems but at a faster rate. When the information in a particular register is to be used by the CPU of the system, that information is called from the selected one of the registers 22, and placed by a multiplexor 25 in a register stage in register cache 24. In register write buffer 24, the information is manipulated and stored as though it were in the primary registers 22. As with other caches, if information not in the cache is necessary to system operation, the arithmetic and logic unit 23 of the CPU 20 goes to the primary registers 22 to obtain that information and some delay is incurred. On the other hand, the register write buffer 24, if designed with an appropriate number of stages for the system with which it is utilized, has a very high likelihood of containing the information necessary to any particular operation so that the overall speed of operation of the system is increased. Overall, the operation of the system using the register cache 24 is much more rapid than is the operation using only the registers 22 because a much smaller number of registers are involved; and these registers are faster. Consequently, the speed of the system is drastically improved. In a preferred embodiment of the invention, the speed of operation is increased twofold over that of more standard systems by the use of the register cache 24.

FIG. 3 illustrates in block diagram form a register write buffer 24 constructed in accordance with the invention. The register cache 24 includes a number of pipelined register stages S1-S16, sixteen in the particular embodiment of the invention. This should be contrasted to the two or three stages found in the usual pipelined system which are provided because of the need to terminate the operation of the pipeline in case of a system interrupt. Each of the stages S1-S16 includes a register capable of storing all of the information which may be stored in any one of the registers 22 illustrated in FIG. 2. Each of the stages S1-S16 also includes control circuitry for transferring the information stored therein to the next stage register during the operation of the register cache 24.

Associated with each of the register stages S1-S16 are a pair of busses 40 and 42 which carry, respectively, register source signal one (RS1) and register source signal two (RS2). Each of the busses 40 and 42 transfers signals to an arithmetic and logic unit (ALU) 44 which is devised in a manner well known to the prior art to accomplish the various logical and manipulative operations involving the data and instructions which may be placed in the registers of the register cache 24. Each stage of the register cache 24 includes an address portion which retains the address and label of the register 22 from which the information was originally taken and which is now represented in the register cache 24.

In operation, when an instruction is received by the CPU, the system looks first for the information to be manipulated in the stages S1-S16 of the register write buffer 24. Presuming that the information exists in the stages of the register write buffer 24, this information which the ALU 44 is to manipulate is provided on the register source busses 40 and 42. For example, the instruction "take RS1, add it to RS2, and place the result in RD" causes the register cache 24 to take the information representing RS1 from the register stage S1-S16 containing that information and place that information on bus 40, to take the information representing RS2 from the register stage S1-S16 containing that information and place that information on bus 42, to add the information in ALU 44, and to furnish the result to the multiplexor 25 so that it may be placed in register stage S1. As the information is placed in stage S1, the information formerly in each stage S1-S16 is shifted by the control circuitry associated with each stage to the next succeeding stage in the usual circumstance.

As each succeeding instruction is received, the information is derived from the appropriate stage S1-S16, provided to the ALU 44 by one of the busses 40 or 42, and the result placed in stage S1, causing the information in all of the stages S1-S16 to shift to the right as seen in FIG. 3. If at any time the particular information is not available in the register cache 24, then the system must search for the information in the group of registers 22. Once the registers 22 are accessed, there is a delay of one clock cycle in the preferred embodiment of the invention while the information is placed on the appropriate bus 40 or 42 and shifted by the multiplexor 25 into the stage S1 where it may be utilized. Although this does delay the system operation to some extent, the speed of the overall operation of the preferred embodiment of the invention is still increased by a factor of approximately two.

The control circuitry associated with each stage of the register cache 24 24 includes a comparator which compares the register address being searched for with the tag given the register stage. In general, if this comparison agrees, the information in the register stage is gated to the bus 40 or 42. The control circuitry involved with each stage also offers other features which significantly improve the operation of the system. For example, the circuitry at each register stage is used in conjunction with the control circuitry of the other stages to determine whether the same register is duplicated at an earlier stage. In a conventional system where an operand has been taken from a register, manipulated by the ALU 44, and replaced in the register in a normal physical set of registers, only the same number of registers exist. However, when this is done with the register cache 24 of the invention, the same primary register 22 may be represented at more than one stage of the register cache 24. In this situation, the information in the higher numbered stage may be stale information which should not be utilized thereafter.

In order to eliminate this stale information, the control circuitry of each stage S1-S16 compares its register designation with that of the other stages S1-S16 and the ALU to determine if the same register designation appears at any other stage or in the ALU. If such register designation appears at more than one stage such a duplicate register designation appears, the succeeding stages are set so that they do not shift to following stages or cause the following stages to shift. The consequence of this failure to shift is that the outdated information is eliminated as information is shifted into the higher numbered stage holding the stale information but the stale information is not shifted to the next stage.

The table of FIG. 4 illustrates the operation of the register cache 24 in carrying out the three following operations:
ADD the contents of R1 to the contents of R2 and place the result in R3,
ADD the contents of R3 to the contents of R4 and place the result in R2,
ADD the contents of R2 to the contents of R3 and place the result in R7.

The times represented are T0 through T4. The values given at time T0 are those assumed to be in the register stages at that time. At time T0, the information from register R1 is not available in the register cache 24, so one clock time is taken while the information is placed into stage S1 shifting the other results by one stage each. This provides the result shown at time T1; R1 and R2 are both available in stages S1 and S5, respectively, and may be added by ALU 44. At time T2, the result of the first addition is placed in stage S1 with the R3 designation in its address tag, shifting the other results by one stage. The operations continue in this manner until time T3. At time T3, the results of adding the contents of R3 and R4 are placed in R2 creating a new register R2 at stage S1. When the new register R2 is inserted into stage S1, the duplicate copy at stage S6 at time T2 is deleted by failure to advance to the next stage. At this point, the control circuitry gates only the information in stage S1 to the bus RS1 and eliminates the information stored in stage S7 by failing to shift it to the next stage. This result is shown at time T4.

In the case of a miss in the register cache 24 (where the information does not reside in the register cache 24 but must be called from the primary registers 22), the primary registers 22 are read and the data is used by the ALU 44 and also inserted into stage S1 by means of the multiplexor 25.

An additional advantage of the use of the register cache 24 of this invention is that the system cost is drastically reduced over that typical of systems using large numbers of high speed registers. In a system using a register cache in accordance with the invention, rather than requiring especially fast memory to provide the primary registers 22, the system may make use of the same type of memory as is used for the normal random access memory of the system thereby reducing system cost. This also avoids the large engineering effort required to design an especially fast set the primary registers 22. The reason that this is possible is that the CPU in looking for information finds that information in the register cache 24 close to ninety-five percent of the time. Consequently, only the few stages of register cache 24 need to be constructed on high speed components while the primary registers 22 may be mapped in ordinary RAM.

Other advantages offered by the use of the register cache are less obvious. For example, because faster access is provided to the registers, condition codes may be computed more rapidly. Computing condition codes more rapidly means that processes which require branching are not penalized. Branching takes between fifteen and twenty percent of overall processor time. If branches are penalized, the loss of time can be up to twenty percent of processing time. Use of the register cache also allows the system to generate the effective addresses for loads and stores rapidly; these are also about twenty percent of the overall processing time; and loss here substantially penalizes system operation.

Although as has been discussed above, the present invention may utilize inter-stage control circuitry to eliminate multiple copies of registers which may contain stale information, it is clear that this particular feature is not necessary to the operation of the overall invention. In fact, a register write buffer may simply shift information between stages sequentially without eliminating redundant registers so long as means is provided for accessing the information in only the most recent register.

The presently preferred embodiment of the invention combines the two arrangements. This embodiment has a first set of five register stages (those immediately to the right of the ALU 44 in FIG. 3) which simply shift information to the right (as seen in FIG. 3) to the next stage. These first stages allow a particular operation to be processed for a time sufficient to determine that exceptions which might invalidate the results will have taken place so that the results of the operation past that point are probably valid. The embodiment then provides eleven additional register stages which, as explained above, eliminate redundant register representations by failing to shift the redundant stages. Such an embodiment provides the best features of both arrangements and allows the very rapid operation of the system.

Figure 5:
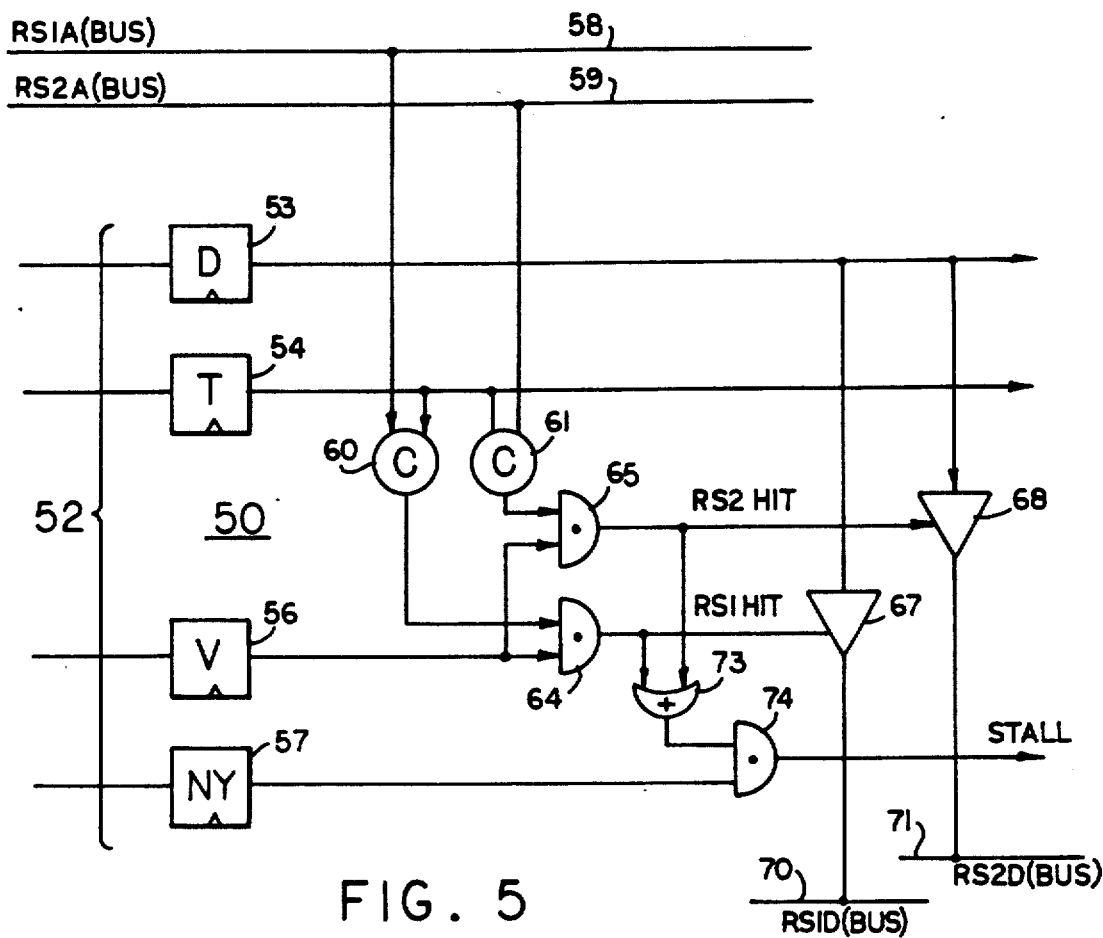
FIG. 5 is a block diagram illustrating one stage of a first portion of the register cache illustrated in FIG. 3.

FIG. 5 illustrates one stage of a register cache 24 in accordance with the present invention. The stage 50 may be one of the first stages of the buffer 24 adjacent the ALU 44 in the embodiment referred to above as the preferred embodiment. Such a stage 50 simply passes the information held therein to the next stage to the right. The circuitry for transferring information one register stage to the right upon the receipt of input information from the left is well known in the art and is for that reason omitted from the description. However, the control information for addressing the register stages and deriving information therefrom is peculiar to this invention and is therefore described in detail.

The stage 50 includes a register 52 which may have bit positions as illustrated for representing data (D) 53, a tag address (T) 54, the validity of the information (V) 56, and an expected to be filled position (NY) 57. The representation of data in the positions 53 will be in accordance with the particular computer system involved and will be obvious to those skilled in the art. The tag address positions 54 include the address of the information in the primary register 22. The validity position 56 describes whether the information in the stage is valid or not. The expected to be filled positions 57 essentially allow a register stage to generate a signal which stalls the processor until the information to be placed upon bus 70 or 71 during a "hit" is ready.

The stage 50 is connected to a pair of register source address busses 58 and 59 which provide address signals to all of the stages of register cache 24 in parallel. The addresses on the busses 58 and 59 are provided at a pair of comparators 60 and 61 which also receive the output of the tag address positions 54. If either address desired is matched in the associated comparator 60 or 61, a true signal is produced at the input to an AND gate 64 or 65. The AND gates 64 and 65 also receive input sensing the true condition of the valid position 56. If the address bits are the same as the address accessed and the information is valid, a hit signal indicating that the information is both available and valid appears on the enabling input of one (or two) of two enable buffers 67 or 68. The enabled one of the buffers 67 or 68 then transfers the data from the data positions 53 to the appropriate one of two data busses 70 (RS1D) or 71 (RS2D) for use by the ALU 44 described above.

For a position which is expected to receive valid data but has not yet received that data, an OR gate 73 senses the output of each of the AND gates 64 and 65 and generates a signal to an AND gate 74. The AND gate 74 also senses the positions 57; and, if a signal indication that data is expected is present, generates a stall output signal which indicates that the information is not yet useable but doesn't interfere with the transfer of the register information to the next register stage.

Figure 6:
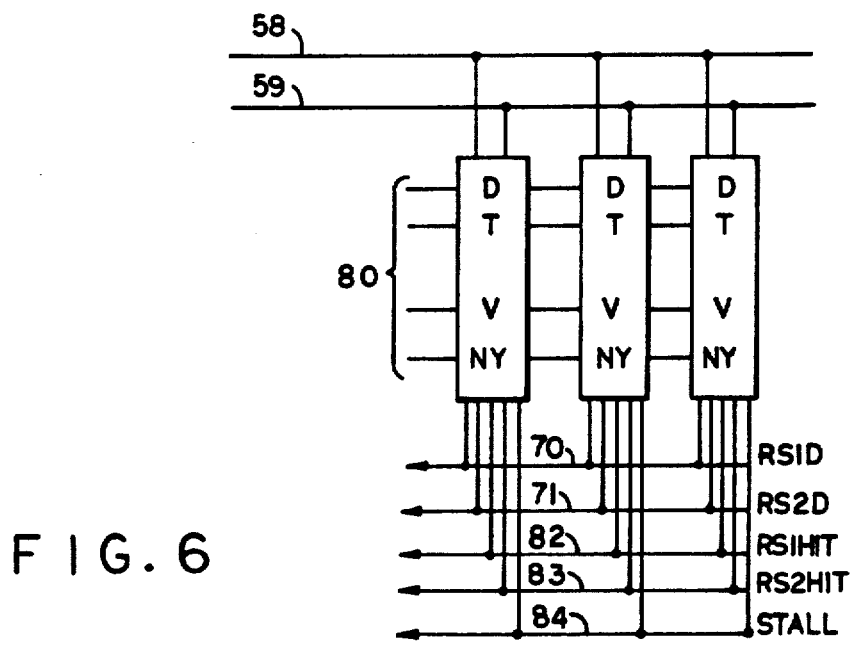
FIG. 6 illustrates three stages as shown in FIG. 5 connected together with their appropriate bus lines for implementing the invention.
Figure 8:
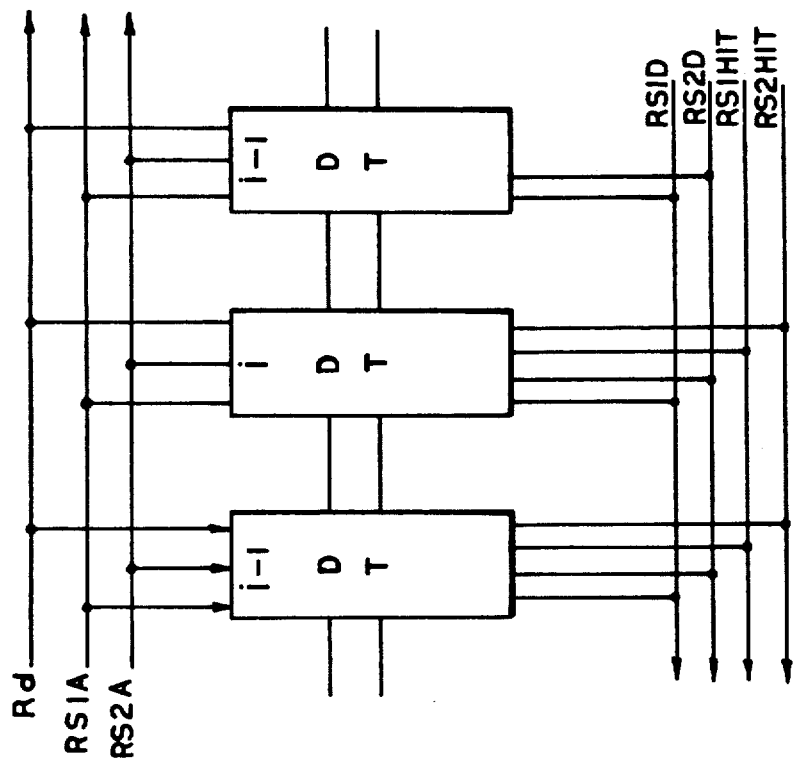
FIG. 8 illustrates three stages as shown in FIG. 7 connected together with their appropriate bus lines for implementing the invention.

FIG. 6 illustrates three stages 50 connected together with their appropriate bus lines for implementing the invention. As has been explained above, the register stages 50 receive input from the immediately preceding stage or the ALU 44 via inputs 80. Address busses 58 and 59 provide input to all stages in parallel. Output is taken on data busses 70 and 71. Output signals are also taken on lines 82 and 83 to indicate a hit for a particular address and are utilized as will be explained in detail below. In addition, a signal indicating the advance of a register which has not yet receive its data appears on a line 84 from the AND gates 74 of each stage 50. This signal may be used to indicate to the system that the information is not yet ready to be used even though it appears to be available in the register stage.

Figure 7:
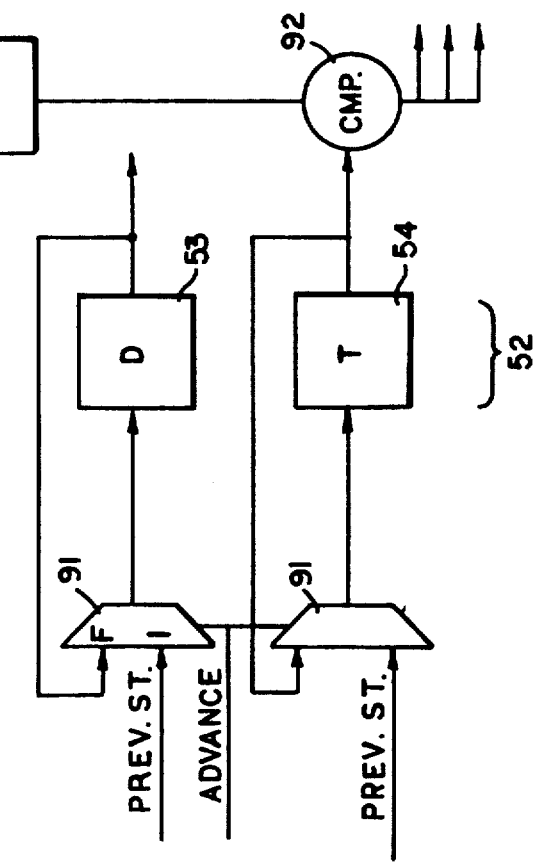
FIG. 7 is a block diagram illustrating one stage of a second portion of the register cache illustrated in FIG. 3.

FIG. 7 illustrates a second register stage 90 which may be utilized with the invention. The stage 90 illustrated therein may conveniently be used as one of the stages of register cache to the right of the stages 50 since the stage 90 is provided with control facilities for eliminating stale register information. The register stage 90 includes all of the portions included in the stage 50 except that the valid bit positions (V) are eliminated once the first stage 90 is entered and the NY (not-yet-available) bit positions 57 are eliminated since the information to be provided will have been provided by the time any stage 90 is reached. However, the remaining portions of the registers 52, the addressing comparators 60 and 61, the AND gates 64 and 65, and the enable buffers 67 and 68 are all provided for each stage 90 and function in the same manner although they are not shown in FIG. 7.

In addition, each stage 90 has at the input to each of the positions 53–54 of the register 52 a multiplexor 91 which receives both the output of the particular positions and the input from the previous register stage. The one of the two signals to be transferred into the register stage is controlled by an advance signal generated in the manner described below. If an advance signal is received, then the information from the previous stage is advanced into the stage stepping the information one stage to the right. If an advance signal is not received, the information in the stage 90 is fed back to its input so that information from the preceding stage is eliminated. It will be seen that this allows stale information to be eliminated from register stages.

The advance signals are generated by a comparator 92 which tests the output of the tag address positions of the particular register stage 90 and all of the previous register stages 90 and 50 and the ALU to provide an advance signal if the address in position 54 of the particular stage 90 is not matched by an address in any of the previous stages or the ALU. This may be provided by a combination of an OR gate which receives inputs from a series of comparators testing the address positions 54 of the present stage 90 with the address positions 54 of each of the previous stages and the addresses in the ALU. This result may be passed through an inverter and ANDed with the result of a hit in the particular stage 90. The consequence is an advance signal is produced when the particular stage includes an address not held in any previous stage or the ALU, but no advance signal is produced if or the ALU a previous stage holds the same register address and thus represents the same one of the primary registers. In this manner, stale information is eliminated in later stages of register cache 24.

The simplicity of the register cache of this invention to provide all of the desirable results mentioned above should be obvious to those skilled in the art. Although the register cache of this invention has been disclosed in a presently preferred embodiment, it will be obvious to those skilled the art that various modifications and variations may be made without departing from the spirit and scope of the invention. It is therefore intended that the invention be defined in terms of the claims which follow.

What is claimed is:

1. A computer processing unit, said computer processing unit comprising:
   a plurality of primary registers, each of said primary registers having a register address tag and register data storage means;
   an arithmetic and logic unit (ALU) for logically combining a first arithmetic input data value received on a first arithmetic input and a second arithmetic input data value received on a second arithmetic input to produce an arithmetic output data value transmitted on an arithmetic data output;
   a multiplexor having a first multiplexor input coupled to said plurality of primary registers, a second multiplexor input coupled to the arithmetic data output of said arithmetic and logic unit, and a multiplexor output for presenting a multiplexor output data value selected between said first and said second multiplexor input;
   a register cache having a register cache input coupled to the multiplexor output and a register cache output coupled to said primary registers, said register cache comprising a plurality of register stages, each of said register stages including storage means for storing a register stage address tag and a corresponding register stage data value, said register stages being arranged as a First-In, First-Out queue;
   first bus means coupled to the first arithmetic input of said arithmetic and logic unit and coupled to each of said plurality of register stages; and
   second bus means coupled to said arithmetic second input of said arithmetic and logic unit and coupled to each of said plurality of register stages.

2. The computer processing unit as claimed in claim 1, wherein said plurality of register stages further comprise:
   a plurality of first register stages, each of said first register stages further comprising valid data indicator means for indicating if said register stage data value is valid and "not yet" indicator means for indicating if the data register stage value is not yet available;
   a plurality of second register stages coupled to said plurality of first register stages, each of said second register stages further comprising feedback means for feeding back the register stage's register stage address tag and corresponding register stage data value.

3. The computer processing unit as claimed in claim 2, wherein each of said plurality of first register stages further comprise:
   first comparison means to compare said register stage address tag with a register address tag upon said first bus means; and
   second comparison means to compare said register stage address tag with a register address tag upon said second bus means.

4. The computer processing unit as claimed in claim 3, wherein each of said plurality of first register stages further comprises:
   first gating means for placing said register stage data value upon said first bus means if said first comparison means detects a match and if said valid data indicator means indicates the register stage data value is valid; and
   second gating means for placing said register stage data value upon said second bus means if said second comparison means detects a match and if said valid data indicator means indicates the register stage data value is valid.

5. The computer processing unit as claimed in claim 4, wherein each of said plurality of second register stages further comprises comparison means for detecting if the register stage address tag matches the register address tag contained in any of the register stages earlier in the First-In, First-Out queue; such that if said comparison means detects a match then said comparison means signals the feedback means of the succeeding register stage to feedback said succeeding register stage's register stage address tag and register stage data value such that the stale register information is eliminated.

6. A register cache for increasing the speed of register accesses within a computer processor, said register cache comprising:
   a first plurality of register stages, said first register stages arranged in a First-In, First-Out queue arrangement, each of said first register stages having memory storage for a register stage address tag, a register stage data value, a valid data indicator, and a 'not yet' available indicator; and
   a second plurality of register stages, said second register stages arranged in a First-In, First-Out queue arrangement, each of said second register stages having memory storage for a register stage address tag and a register stage data value;
   wherein said first plurality of register stages are connected to said second plurality of register stages in a First-In, First-Out queue arrangement where said first plurality of register stages are located ahead of said second plurality of register stages.

7. The register cache as claimed in claim 6, wherein said register cache is coupled to an arithmetic and logic unit and a plurality of primary registers through a multiplexor.

8. The register cache as claimed in claim 7, further comprising:
   a first bus having data and address lines coupling said first plurality of register stages, said second plurality of register stages, and a first input of said arithmetic and logic unit; and
   a second bus having data and address lines coupling said first plurality of register stages, said second plurality of register stages, and a first input of said arithmetic and logic unit;
   such that the arithmetic and logic unit may access the register stage data value represented within any register stage of the register cache.

9. The register cache as claimed in claim 8, wherein each register stage of said plurality of first register stages further comprises:

first comparison means for comparing said register stage address tag stored in said register stage storage means with a register address tag upon said first bus; and second comparison means for comparing said register stage address tag stored in said register stage storage means with a register address tag upon said second bus.

10. The register cache as claimed in claim 9, wherein each register stage of said plurality of first register stages further comprises:

first gating means for placing said register stage data value upon said first bus if said first comparison means detects a match and if said valid data indicator indicates the register stage data value is valid; and second gating means for placing said register stage data value upon said second bus if said second comparison means detects a match and if said valid data indicator indicates the register stage data value is valid.

11. A method for decreasing the time required to access a register within a computer processor, said method comprising the steps of:

providing a primary register storage for storing a plurality of registers, each of said registers having an address tag and having a storage means for storing a register data value;

providing an arithmetic and logic unit within said computer processor;

providing a plurality of register stages for representing registers, said register stages arranged in a First-In, First-Out queue arrangement after said arithmetic and logic unit;

loading a representation of a register into a first register stage of said plurality of register stages from said primary register storage when said register is required for a calculation within said arithmetic and logic unit;

accessing said representation of said register within said register stage as needed;

advancing said representation of said register to successive register stages in said First-In, First-Out queue arrangement when a new register needs to be accessed;

restoring said register representation to said primary register storage when said register representation overflows from the end of said First-In, First-Out register stage queue arrangement.

* * * * *